United States Patent
McDonald

(10) Patent No.: US 10,791,749 B2
(45) Date of Patent: Oct. 6, 2020

(54) APPARATUS WITH MULTIPLE NOZZLES FOR CLEANING CRUSTACEA OR GAME

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 0 days.

(21) Appl. No.: 16/381,539

(22) Filed: Apr. 11, 2019

(65) Prior Publication Data

US 2019/0230945 A1 Aug. 1, 2019

Related U.S. Application Data

(63) Continuation-in-part of application No. 16/106,349, filed on Aug. 21, 2018, which is a continuation-in-part of application No. 15/988,651, filed on May 24, 2018, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.
| | | |
|---|---|---|
| *A22C 29/00* | (2006.01) | |
| *A22C 29/04* | (2006.01) | |
| *A22C 25/02* | (2006.01) | |
| *B08B 3/04* | (2006.01) | |
| *B08B 3/10* | (2006.01) | |
| *B08B 3/06* | (2006.01) | |

(52) U.S. Cl.
CPC ............ *A22C 29/043* (2013.01); *A22C 25/02* (2013.01); *B08B 3/048* (2013.01); *B08B 3/06* (2013.01); *B08B 3/102* (2013.01)

(58) Field of Classification Search
CPC .............................. A22C 29/00; A22C 29/043
USPC ...................... 452/173; 43/54.1, 55, 56, 57.1
See application file for complete search history.

(56) References Cited

U.S. PATENT DOCUMENTS

| | | | | |
|---|---|---|---|---|
| 2,779,052 A | * | 1/1957 | Zebarth | ................... A23B 4/066 |
| | | | | 62/348 |
| 2,832,989 A | * | 5/1958 | Harris | ................... A22C 29/046 |
| | | | | 452/14 |
| 2,866,998 A | * | 1/1959 | Turner | ................... A22C 21/02 |
| | | | | 452/80 |
| 2,870,478 A | * | 1/1959 | Schuster | ............... A22B 5/0058 |
| | | | | 452/173 |
| 3,024,800 A | * | 3/1962 | Lewis | ................... B67D 1/0437 |
| | | | | 137/209 |

(Continued)

*Primary Examiner* — Richard T Price, Jr.
(74) *Attorney, Agent, or Firm* — Egbert, McDaniel & Swartz, PLLC

(57) ABSTRACT

An apparatus for cleaning crustacea or game has a container with an interior volume defined by a wall, a fluid inlet extending into the interior volume of the container, and a plurality of nozzles connected to the fluid inlet. The plurality of nozzles are directed in different directions. The plurality of nozzles are positioned adjacent to the wall of the container so as to direct the fluid from the fluid inlet toward another portion of the wall of the container. The fluid inlet is adapted to pass a fluid under pressure into the interior volume of the container. The plurality of nozzles are arranged one above another.

8 Claims, 4 Drawing Sheets

(56) References Cited

U.S. PATENT DOCUMENTS

| | | | | |
|---|---|---|---|---|
| 3,881,209 | A * | 5/1975 | Reinitz | B08B 3/02 15/102 |
| 4,015,614 | A * | 4/1977 | Jonsson | A61G 9/00 134/152 |
| 4,930,648 | A * | 6/1990 | Hundt | B65D 1/20 220/1.5 |
| 5,158,200 | A * | 10/1992 | Vago | F16L 41/10 220/289 |
| 5,232,120 | A * | 8/1993 | Dunken | B65D 1/20 220/661 |
| 5,312,293 | A * | 5/1994 | Rankin | A22B 5/0082 452/173 |
| 5,375,732 | A * | 12/1994 | Bowers | B65D 25/16 220/669 |
| 5,808,615 | A * | 9/1998 | Hill | G06F 16/313 715/853 |
| 6,032,819 | A * | 3/2000 | Hanna | A47K 5/1204 220/501 |
| 6,083,095 | A * | 7/2000 | Simmons | A22C 21/0061 452/123 |
| 8,556,236 | B2 * | 10/2013 | Glomset | B01F 3/0446 261/76 |
| 8,562,824 | B2 * | 10/2013 | Thiers | B01D 1/305 210/180 |
| 8,720,735 | B2 * | 5/2014 | Terada | F16J 12/00 122/195 |
| 8,960,486 | B2 * | 2/2015 | Goodwin | B01F 7/00691 220/661 |
| 9,061,826 | B2 * | 6/2015 | Rapparini | A47J 31/46 |
| 9,320,286 | B1 * | 4/2016 | McDonald | A22C 17/08 |
| 9,446,436 | B2 * | 9/2016 | Powell | B01D 11/0284 |
| 9,540,290 | B2 * | 1/2017 | Winslow | C05F 9/02 |
| 2005/0167372 | A1 * | 8/2005 | Heist | C02F 1/004 210/787 |
| 2008/0035185 | A1 * | 2/2008 | Baratta | B44D 3/006 134/137 |
| 2010/0224220 | A1 * | 9/2010 | Cantrell | A47L 15/0089 134/25.1 |
| 2010/0297923 | A1 * | 11/2010 | Brown | A22B 5/0082 452/173 |
| 2011/0041880 | A1 * | 2/2011 | Sheffield | B44D 3/006 134/115 R |
| 2011/0309084 | A1 * | 12/2011 | Wang | F17C 1/00 220/530 |
| 2012/0012214 | A1 * | 1/2012 | Loporchio | E03F 5/042 137/800 |
| 2012/0024718 | A1 * | 2/2012 | Foret | A23B 4/015 205/687 |
| 2014/0127986 | A1 * | 5/2014 | Cady | A22C 17/08 452/173 |
| 2015/0183570 | A1 * | 7/2015 | Chen | B65D 25/38 220/661 |
| 2016/0144412 | A1 * | 5/2016 | McDonald | B08B 3/102 134/25.3 |

* cited by examiner

APPARATUS WITH MULTIPLE NOZZLES FOR CLEANING CRUSTACEA OR GAME

RELATED U.S. APPLICATIONS

The present application is a continuation-in-part of U.S. patent application Ser. No. 16/106,349, filed on Aug. 21, 2018, and entitled "Assembly for the Cleaning and Cooking of Seafood and Crustacea". U.S. patent application Ser. No. 16/106,349 is a continuation-in-part of U.S. patent application Ser. No. 15/988,651, filed on May 24, 2018 and entitled "Apparatus and Assembly for the Cleaning and Cooking of Seafood and Crustacea", presently pending. U.S. patent application Ser. No. 15/988,651 is a continuation-in-part of U.S. patent application Ser. No. 14/877,519, filed on Oct. 7, 2015, and entitled "Apparatus and Method for Washing Meat and/or Produce", presently pending. U.S. application Ser. No. 14/877,519 is a continuation-in-part of U.S. patent application Ser. No. 14/812,545, filed on Jul. 29, 2015, and entitled "Apparatus and Method for Cleaning Produce". U.S. patent application Ser. No. 14/812,545 issued as U.S. Pat. No. 9,408,412 on Aug. 9, 2016. U.S. application Ser. No. 14/812,545 is a continuation-in-part of U.S. application Ser. No. 14/550,195, filed on Nov. 21, 2014. U.S. patent application Ser. No. 14/550,195 issued as U.S. Pat. No. 9,320,286 on Apr. 26, 2016 and was entitled "Apparatus and Method for Cleaning Game".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the cleaning or washing of crustacea or game. More particularly, the present invention relates to the cleaning of crawfish prior to boiling the crawfish. More particularly, the present invention relates to apparatus that remove debris from the surface of the crustacea or game.

2. Description of Related Art Including Information Disclosed Under 37 CFR 1.97 and 37 CFR 1.98

Seafood boils refer to various types of social events in which shellfish or crustacea are the central elements. Regional variations dictate the kinds of seafoods, the accompaniments and side dishes, and in the preparation techniques (e.g. boiling, steaming, baking, or raw). In some cases, a boil may be sponsored by a community organization as a fundraiser or a mixture. Boils are also held by individuals for their friends and family for weekend get-togethers and summer holidays. There are also companies that can cater a boil for large and small events.

Shrimp, crab and crawfish boils are a Louisiana tradition and can be found across Louisiana and along the Gulf Coast. These shrimp, crab and crawfish boils are becoming more popular in various other areas around the United States and foreign countries. One reason for the popularity of crawfish is the price. Shrimp and crab or higher valued crustacea and may be a less affordable option for larger groups. A boil is usually carried out in a large pot (60 to 80 quarts) fitted with a strainer and heated by propane. Seasonings include crawfish boil packets, cayenne pepper, hot sauce, salt, lemons and bay leaves. Ears of corn, new potatoes, onions, and heads of garlic are usually added in shrimp and crawfish boils. Some people add smoked sausage links or mushrooms. When cooking crawfish, there is a debate over whether or not the crawfish must first be purged by covering them with clear water and a generous amount of salt for a few minutes. Advocates argue that this forces the crawfish to rid their bodies of impurities.

Prior to boiling the crustacea, it is important to clean the crustacea. Typically, the crawfish and shrimp can have debris and impurities on the outer surface thereof. If the crustacea are not cleaned, then this can present a gritty or unpleasant taste following the boil. Typical cleaning preparations, in the past, have been to place a large amount of crawfish into a bucket and then using a hose to spray water over the crawfish in the bucket. After the bucket is filled with water, the bucket is tipped over by hand manipulation so as to remove the debris-containing water. This requires a great deal of manual effort. Additionally, so as to assure that the crawfish and/or shrimp are very clean, this cleaning step must be carried out multiple times. Ultimately, after a suitable amount of cleaning, the crawfish or shrimp will be ready for the boil. During the steps of cleaning, it is quite common for some of the crawfish to escape the cleaning bucket. These crawfish must be manually retrieved and returned for further processing. Many people find that the process of cleaning the crawfish or shrimp is time-consuming and unpleasant. As such, a need has developed so as to be able to efficiently clean the crustacea prior to the step of boiling.

In the past, various patents have issued relating to processes for cleaning crustacea, such as crawfish. In particular, U.S. Pat. No. 2,660,754, issued on Dec. 1, 1953 to F. O. Roshko, shows a crawfish picking machine for separating meat from the hulls of crawfish. The picking machine includes a frame having an upper and a lower roller mounting member, upper and lower parallel horizontally disposed rollers mounted one substantially vertically above the other on these members, adjustable tensioning means between the mounting members that yieldably urge the members and the associated rollers together to form a crotch between the rollers, and a drive means operatively connected with the rollers for positively rotating the rollers in opposite directions at a uniform rate. A water jet sprays in front of the crotch substantially parallel with the lower forward peripheral portion of the upper roller and has jet openings directed toward the peripheral portion of the upper roller between the spray and the crotch.

U.S. Pat. No. 2,781,544, issued on Feb. 19, 1957 to T. C. Skarmetta, shows a seafood cleaning machine. This shrimp cleaning machine includes a longitudinally extending generally flat shrimp-receiving platform having flexible, transversely downwardly curved side edges, a support means of which the flexible side edges are entrained, a means operatively connected the platform for transversely reciprocating the platform, longitudinally extending rollers engaging a top surface of the platform adjacent the side edges to form crotches with the platform. The rollers are oscillatably driven by their contact with the top surface of the platform. The surfaces of the rollers and the platform have different coefficients of friction whereby a shrimp received in a crotch will cling to one surface and slip on the other surface to thereby rotate the shrimp until a loose end of the shell is caught between the roller and the platform and the shell is unwound from the shrimp and drawn through the crotch and from the platform.

U.S. Pat. No. 3,958,022, issued on may 18, 1976 to A. Danesh, describes a process for treating seafood. This treatment of seafood allows toxic heavy metal ions to be removed from the seafood so as to make the seafood safe for consumption. The method includes washing the seafood with an organic sulfur complexing agent for heavy metal ions and heating the seafood at a temperature and for a time sufficient to volatilize the heavy metal ions therefrom.

U.S. Pat. No. 7,087,257, issued on Aug. 8, 2006 to Prestenbach, teaches a crustacea and seafood process for preparing fresh uncooked crustaceans, such as crawfish, lobster, crab and shrimp for shipment to consumers in a frozen state. The process includes a washing process. This washing process submerges the crustaceans in a few inches of clean running water. The crustaceans are treated with ozone introduction of a preservative and a bacteriacide while under a vacuum. The crustaceans are spray coated with a seasoning and then quick frozen. They are then packaged in bulk for individualized cook-and-serve containers.

During the course of hunting, it becomes necessary to harvest the meat from the killed game. The game can be in the nature of birds, fish, deer, boars, and other commonly-hunted game. When the meat is harvested, the harvested meat is often tossed into a container, along with the associated debris, such as feathers, hair, blood, scales, and related debris. After the meat is collected in the container, the meat must be meticulously cleaned in order to separate the debris from the meat. This is a very time-consuming and difficult operation. As such, a need has developed so as to provide an apparatus and method so as conveniently and efficiently separate the debris from the meat.

In particular, in the hunting of fowl, the bird is de-breasted so that the breast meat can be tossed into the container. The person harvesting the meat will often have feathers and blood on his or her hands. Whenever the harvested breast is tossed into the container, the feathers and blood will also be passed into the container. After all of the breasts, blood and feathers have been accumulated in the container, another operation is required to take each of the breasts from the container and meticulously clean the breast of blood and feathers. As a result, a clean bird breast is obtained.

In the case in which fish are the game that is being caught, the fillets of the fish are separated from the body of the fish and also tossed into the container. During the process of descaling the fish, residual scales and blood will reside on the hands of the person cleaning the fish. The scales and blood will be delivered, along with the harvested meat, into the container. Once again, a need has developed so as to be able to properly separate the meat of the fish from the scales and the blood.

In the past, various patents have issued relating to devices for cleaning game. For example, U.S. Pat. No. 2,860,371, issued on Nov. 18, 1958 to R. M. Krull, describes a fish cleaning device. This fish cleaning device includes a generally cylindrical housing. The housing has a plurality of longitudinal corrugations therein spaced around an upper compartment. An electric motor is mounted in the lower compartment and has a vertical shaft extending through the wall into the upper compartment. A scaling plate is mounted on the shaft in rotatable relationship therewith adjacent the wall in the upper compartment. The plate has a plurality of angularly spaced upwardly projecting generally radial ridges thereon so as to cause tumbling action in fish contained in the upper compartment.

U.S. Pat. No. 2,966,159, issued on Dec. 27, 1960 to R. C. Ruegnitz, describes an egg washing apparatus. This egg washing apparatus includes a container having an imperforate detachable cover and includes a Tchamber adapted to receive a liquid. A perforate basket supports eggs within the container and has a sleeve extending centrally therein above a horizontal plane defined by the upper rim of the basket. The basket is removably suspended within the chamber. An agitator is provided that includes a vertical shaft equipped with a plurality of elongated vertical blades. A motor is arranged with the agitator for rotating the agitator.

U.S. Pat. No. 4,173,051, issued on Nov. 6, 1979 to J. P. Reid, describes a vegetable washer for washing food articles. The washing apparatus includes a container for housing the food articles, an agitation system and washing system for removing undesired foreign materials from the surface of the food articles, and a discharge system.

U.S. Pat. No. 4,726,095, issued on Feb. 23, 1988 to Bissell Jr. et al., discloses a fish scaler device. The device includes a water bucket, an abrasive continuous surface within the bucket, and an agitator for water within the bucket. As the water is agitated, fish suspended within the bucket gently tumble against the abrasive surface and are thereby scaled. The abrasive surface is an inwardly dimpled bucket liner. The agitator is a rotatable impeller.

U.S. Pat. No. 4,763,386, issued on Aug. 16, 1988 the H. A. Wissbroecker, teaches a fish scaling apparatus that includes a container and a cylindrical insert including a plurality of inwardly-extending projections. The projections are provided with a rough or sharp edge. A paddle member is disposed within the interior of the cylindrical insert and is connected to a shaft extending exterior of the container. The shaft is adapted for connection to the chuck of a portable drill. When the drill is operated, the rotation of the paddle member occurs within the interior of the cylindrical insert. The rotation causes fish disposed within the interior of the cylindrical insert to come into contact with the inwardly-extending projections so as to remove the scales from the fish.

U.S. Pat. No. 4,876,768, issued on Oct. 31, 1989 the C. K. Bright, shows a fish scaler that includes a bucket. A perpendicularly extending rod is rotatably connected to the lid of the bucket. A scaling element is attached to the rod. A plurality of scaling protrusions are attached to the exterior of the scaling element. The rotation of the scaling element causes relative movement between the scaling protrusions and the suspended fish so as to remove the scales from the suspended fish.

U.S. Pat. No. 5,129,855, issued on Jul. 14, 1992 to Bruckert et al., describes a fish scaler apparatus that includes an exterior cylindrical container with an interior cylindrical insert. A central axle is directed through a lid of the container so as to accommodate a drill so as to permit the rotation of the axle. The axle includes a central conduit with exterior ports to effect the washing of the fish within the container. The ports are in fluid communication with a fluid source, such as a garden hose.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

U.S. Pat. No. 9,320,286, issued on Apr. 26, 2016 to the present inventor, shows an apparatus and method for cleaning game. This apparatus has a container with an interior volume defined by a wall and a pipe positioned in the container adjacent to the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe.

U.S. Pat. No. 9,408,412, issued on Aug. 9, 2016 to the present inventor, describes an apparatus and method for cleaning produce. This apparatus has a container with an interior volume defined by a wall in a pipe positioned in the container adjacent the wall. The pipe has at least one aperture suitable for directing a flow of water toward a portion of the wall spaced from the pipe such that the flow of water creates a cyclonic path in the container. The pipe extends generally appropriate vertically along the wall of the container. The pipe includes a plurality of apertures formed in spaced relation to each other along the length of the pipe. The method includes overflowing the container such that the debris on the produce is removed from the produce.

It is an object of the present invention to provide an apparatus for cleaning crustaceans or game that efficiently and effectively separates debris from the body of the crustaceans or the game.

It is another object of the present invention provide an apparatus for cleaning crustacea and game serves to pressure wash the crustacea or game.

It is another object of the present invention provide an apparatus for cleaning crustacea and game that avoids the need to hand wash the crustacea or game.

It is still another object of the present invention to provide an apparatus for washing crustacea or game that facilitates the ability to clean the container after the washing process.

It is still a further object of the present invention to provide an apparatus for cleaning crawfish which avoids the loss of crawfish during the washing process.

These and other objects and advantages of the present invention will become apparent from a reading of the attached specification and appended claims.

BRIEF SUMMARY OF THE INVENTION

The present invention is an apparatus for cleaning crustacea or game that comprises a container having an internal volume defined by a wall, a fluid inlet extending into the interior volume of the container so as to pass a fluid under pressure into the interior of the container, and a plurality of nozzles connected to the fluid inlet. The plurality of nozzles are connected to the flow inlet. The plurality of nozzles are directed in different directions. The plurality of nozzles are positioned adjacent to the wall of the container so as to direct the fluid from the fluid inlet toward another portion of the wall of the container.

The plurality of nozzles are arranged one above the other. One of the plurality of nozzles is directed generally toward the bottom of the container. Another of the plurality of nozzles is directed toward the upper edge of the container. The plurality of nozzles are adapted to direct the flow in a cyclonic pattern within the container.

Each of the plurality of nozzles has an opening. This opening can be either a slit, a chord of a circle, or a circle.

The fluid inlet extends through the wall of the container. The fluid inlet has a portion positioned exterior of the container. A connector is affixed to the portion of the fluid inlet exterior of the container.

The container has a diameter greater than a height of the container. The container has a lip extending outwardly of the upper edge thereof. The lip curves outwardly and downwardly from the upper edge.

A drain is affixed to the wall of the container and communicates with the interior volume of the container. The drain is positioned adjacent to a bottom of the container. The drain has a first end positioned outwardly of the wall of the container and a second end positioned within the interior volume of the container. The drain has an interior passageway extending between the first and second ends. The second end has a plurality of openings communicating with the interior passageway. The first end of the drain has a thread thereon. This thread is adapted to connect with a hose. A closure can be removably affixed to the drain.

The connector is a water hose connector such that the pipe can be connected to a water hose. The container has a first handle and a second handle formed or affixed adjacent the upper edge of the container. The first handle is diametrically opposite to the second handle. In the preferred embodiment the present invention, the crustacea are crawfish.

The plurality of nozzles comprises at least three nozzles. These nozzles are directed at an obtuse angle with respect to the fluid inlet. The present invention can include a water source and a hose connected to the water source and connected to the fluid inlet so as to pass water under pressure from water source into the fluid inlet.

This foregoing Section is intended describe, with particularity, the preferred embodiments of the present invention. It is understood that modifications to these preferred embodiments can be made within the scope of the present claims. As such, this Section should not be construed, in any way, as limiting of the broad scope of the present invention. The present invention should only be limited by the following claims and their legal equivalents.

DETAILED DESCRIPTION OF THE INVENTION

Figure 1:
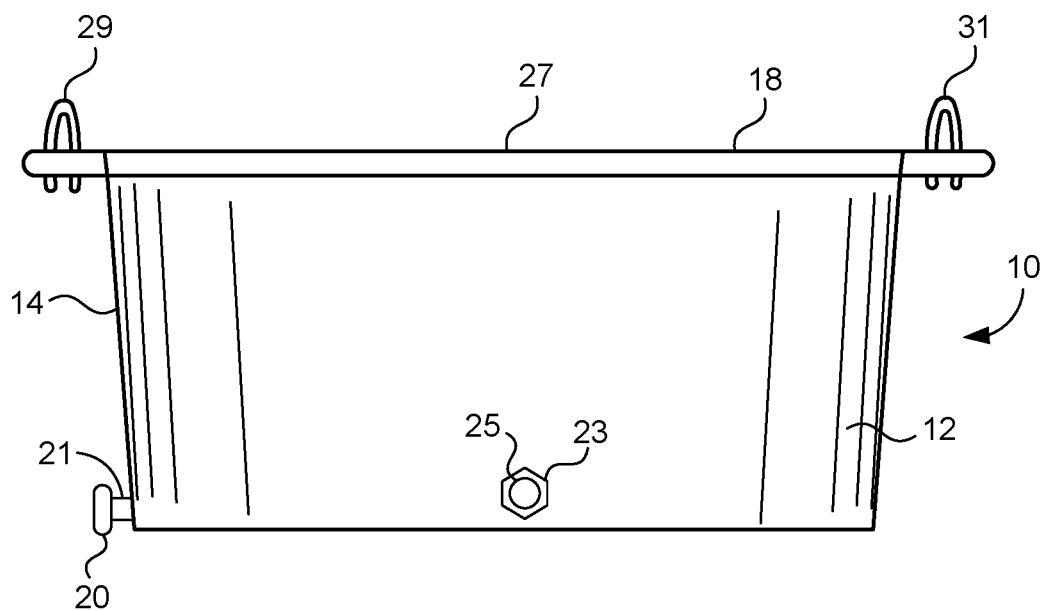
FIG. 1 is a side elevational view of the apparatus for cleaning crustacea or game in accordance with the preferred embodiment the present invention.

Referring to FIG. 1, there shown the apparatus 10 used for the cleaning of crustacea or game in accordance with the present invention. The apparatus 10 includes a container 12 having an interior volume defined by a wall 14. The container 12 has a bottom 16 and an upper edge 18. An inlet pipe 20 positioned adjacent the bottom 16 of the container 12. The inlet pipe 20 has a portion 21 that extends outwardly of the wall 14 of the container 12. A drain 23 is affixed through the wall 14 of the container 12. The drain 23 will communicate with the interior volume of the container 12. The drain 23 is positioned adjacent to the bottom 16 of the container 12. The closure 25 can be removably affixed over the open end of the drain 23 so as to block the flow of fluid from or into interior volume of the container 12.

In FIG. 1, it can be seen that the container 12 has a diameter that is greater than a height of the container 12. For the washing of crawfish, this is particularly important so as to create the desired cyclonic path of water for the proper cleaning of crawfish within the interior volume of the container 12. A lip 27 extends outwardly of the upper edge 18 of the container 12. As will be described hereinafter, the lip 27 curves outwardly and downwardly from the upper edge 18. A first handle 29 and a second handle 31 are formed or affixed adjacent to the upper edge 18 of the container 12. The first handle 29 is diametrically opposite to the second handle 31. In the embodiment of the present invention shown in FIG. 1, each of the handles 29 and 31 can be formed of a flexible cord-type material, such as a rope or a loop. The first handle 29 and the second handle 31 allows a user to properly move the container 12 to a desired location.

The wall 14 of the container 12 is tapered so as to widen from the bottom 16 toward the upper edge 18. This tapered configuration allows multiple containers 12 to nest within one another. This facilitates the ability to store, ship, and display the apparatus 10. As such, this tapered configuration will allow for a small amount of space to exist between the bottom of a higher container and the bottom of a lower container. As such, this space can be used to accommodate the various appliances, such as the connector 20, the drain 23, and the closure 25.

Figure 2:
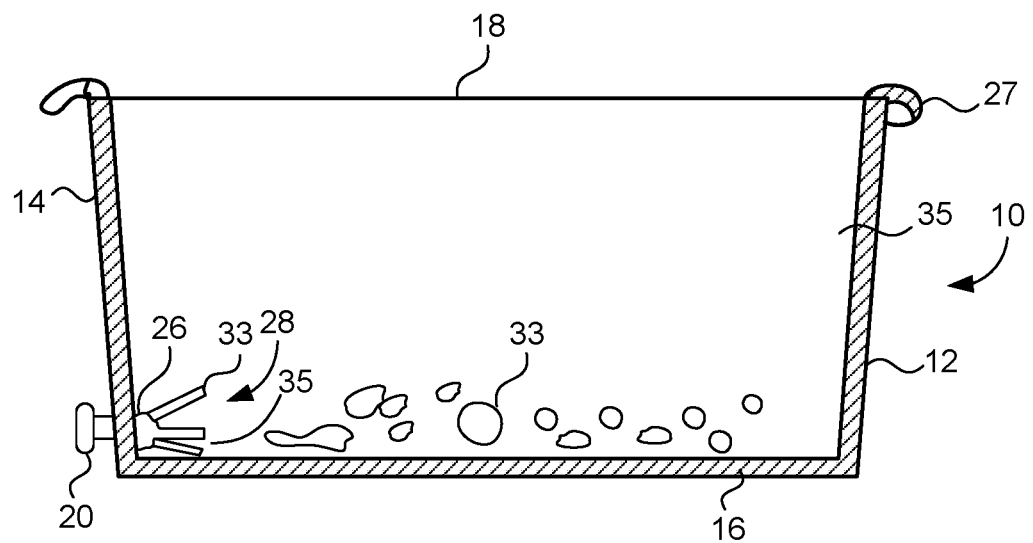
FIG. 2 is a cross-sectional view showing the apparatus for cleaning crustacea or game in accordance with the preferred embodiment of the present invention.

FIG. 2 is a cross-sectional view of the apparatus 10 of the present invention. In FIG. 2, can be seen that the fluid inlet 26 extends through the wall 14 of the container 12. The fluid inlet 26 includes the inlet pipe 20 (as shown in FIG. 1). A connector is affixed to the fluid inlet 26 on a portion of the fluid inlet 26 extending outwardly of the wall 14 of the container 12 at an exterior of the container 12. A plurality of nozzles 28 are illustrated as extending outwardly from the fluid inlet 26. The fluid inlet 26 is adapted deliver fluid, such as water, under pressure into each of the nozzles 28. A lowermost nozzle 28 is generally directed toward the bottom 16 of the container 12. An uppermost nozzle of the plurality of nozzles 28 is generally directed toward the upper edge 26 of the container 12. There is a central nozzle between the lowermost nozzle in the uppermost nozzle which is directed in a direction generally parallel to the bottom 16 of the container 12. In normal use, the lowermost nozzle 31 directs a pressurized flow of water adjacent to the bottom 16 of the container 12. This particular flow of water will flow adjacent to the bottom 16 so as to generally provide an agitation and a lift to the crustacea 33 residing on the bottom 16. The uppermost nozzle 33 serves to direct a pressurized flow of water to the crustacea 33 that may be suspended within the interior volume 35 of the container 12. As such, nozzle 33 acts to pressure wash the crustacea 33. The central nozzle 35 is also directed toward the crustacea 33 as they become elevated from the bottom 16 of container 12. Nozzle 35 serves to remove debris from the crawfish and wash the crustacea.

In FIG. 2, the lip 27 is particularly illustrated. Lip 27 extends outwardly of the upper edge 18 of the container 12 so as to curve outwardly and downwardly from the upper edge. This curved lip is important in the process of cleaning crawfish. Crawfish are alive when they are being cleaned. As such, if there are sharp edges or corners at the upper edge 18 of the container 12, the crawfish will have a surface to grasp in order to crawl out of the container 18. The curved surfaces associated with the lip 27 inhibit the ability of the crawfish to get a proper hold onto any edge for the purposes of crawling out of the container 12. Furthermore, the curved surface formed by lip 27 slows the flow of water outwardly of the container 12 during the process of washing so that a more complete cleaning of the crawfish can be carried out.

In FIG. 2, it can be seen that the plurality of nozzles 28 are arranged one above the other. Additionally, the plurality of nozzles 28 will be directed at an obtuse angle with respect to the longitudinal axis of the fluid inlet 26. This configuration of the plurality of nozzles 28 serves to create a cyclonic flow path of water within the interior volume 35 of the container 12. This configuration is particularly illustrated in FIG. 3.

Figure 3:
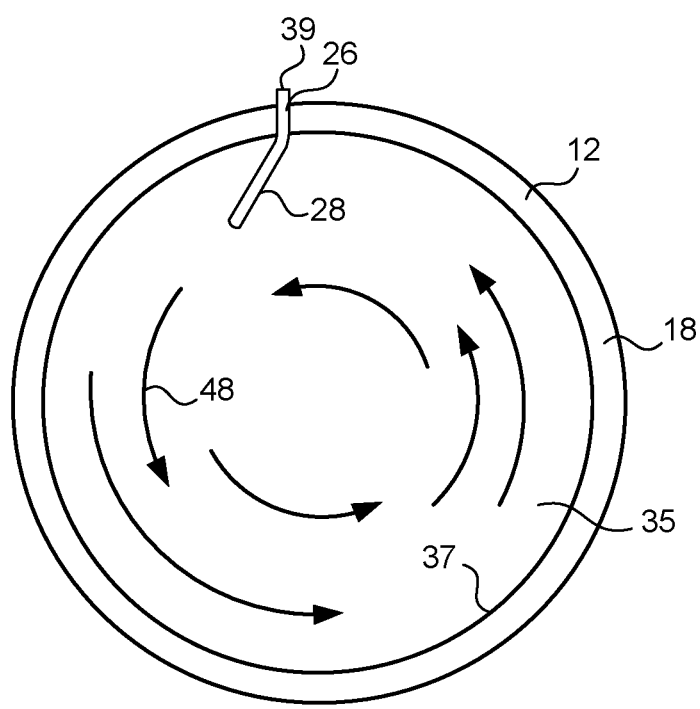
FIG. 3 is a plan view showing the cyclonic flow path of water in the container of the apparatus of the present invention.

FIG. 3 illustrates a plan view of the container 12 showing the upper edge 18 of the container 12. The container 12 has an inner wall 37 that defines the interior volume 35 of the container 12. The plurality of nozzles 28 extend at an obtuse angle with respect to the fluid inlet 26. The direction of the plurality of nozzles 28 creates the cyclonic path of water flow within the container 12.

Water is directed from the interior of the fluid inlet 26 outwardly through the plurality of nozzles 28. The water flow is generally directed toward the inner wall 37 of the container 12 at an area away from the fluid inlet 26. The cyclonic path of water flow 48 serves to effectively separate the debris from the crustacea or game. The plurality of nozzles 28 distribute the jets of water over a substantial portion of the height of the container 12. This has been found to enhance the strength of the cyclonic flow path and to create an improved washing effect. The various water flows from the plurality of nozzles 28 serve to substantially increase the turbulence within the container for the purpose of separating debris from the crustacea or game. The water flow 48 agitates the water flow and pressure washes the crustacea or game simultaneously.

Figure 4A:
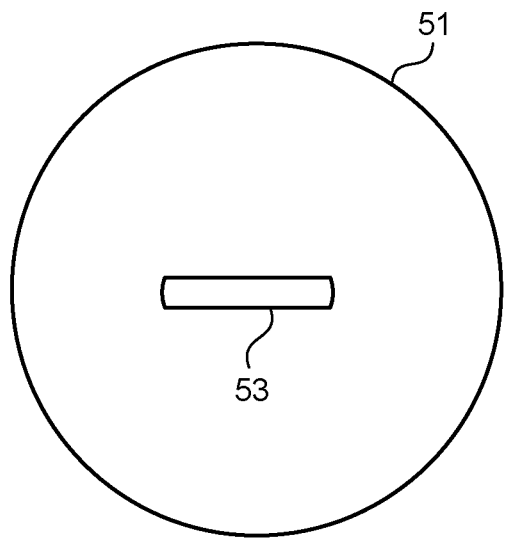
FIGS. 4A-C show different configurations of the opening of the nozzle.
Figure 4B:
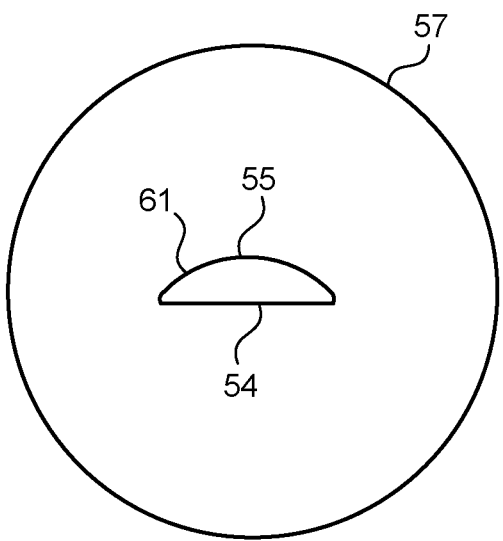
Figure 4C:
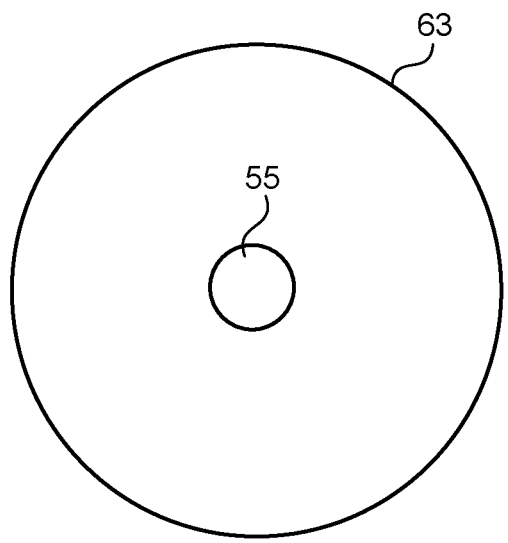

FIGS. 4A-4C illustrate the various types of openings or apertures at the end of the plurality of nozzles 28. In particular, FIG. 4A shows one type of nozzle 51 having a slit 53 opening at the end thereof. This creates a water jet of a generally laminar flow. FIG. 4B illustrates an opening 55 which is a chord of a circle on nozzle 57. The opening 55 has a flat surface 59 and a curved surface 61. It has been found that this type of opening creates a laminar flow the water flowing over the straight surface 59. The curved surface 61 tends to distribute the water flow in a fan-type pattern upwardly and outwardly of the nozzle 57. FIG. 4C shows a nozzle 63 having a circular opening 65. This circular opening directs a purely fan-style flow of water in various directions so as to distribute the flow of water over a greater area.

Figure 5:
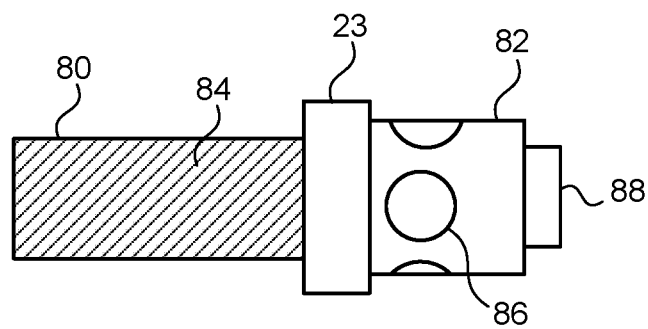
FIG. 5 is a side elevational view of the drain as used on the container of the apparatus of the present invention.

FIG. 5 illustrates the drain 23 that is used on the container 12. The drain 23 has a first end 80 and a second end 82. The first end 80 has threads 84 thereon. Threads 84 are adapted to accommodate the threaded fitting of a water hose. As such, if it is desired to cause the draining of the container 12 to a remote location, a water hose can be connected to the drain 23 at the first end 80 and then draped to a desired location for disposing of the water. As an example, if the user does not wish to drain the container 12 on a patio or driveway, a hose can be connected to the threaded connection 84 and moved so that the water can be released of into a sewer system, a lawn, a body of water, or other location.

It can be seen that the second end 82 will be located within the interior 35 of the container 12. The second end 82 includes a plurality of openings 86 formed therethrough. The plurality of openings 86 will open to an interior passageway extending through the drain 23. Another opening 88 can be located at the end of the interior passageway of the drain 23. If any of the openings 86 and 88 should become clogged, the drain can still properly operate through the use of the other openings.

Importantly, the drain 23 is particularly adapted to allow the user to clean the interior of the container after use. After the debris is been removed from the crustacea or game, a certain amount of the debris will drift to the bottom of the container and reside thereon. The drain 23 can be used so as to drain the water from the container in a desired manner. Furthermore, the drain 23 can also be utilized so as to allow for water to be introduced into the container so as to clean the interior of the container. For example, a water hose can be connected to the threaded fitting 84 at the first end 80 so as to introduce water, under pressure, through the drain 23 and through the openings 86 and 88. As such, the present invention facilitates the proper cleaning of the interior of the container.

Figure 6:
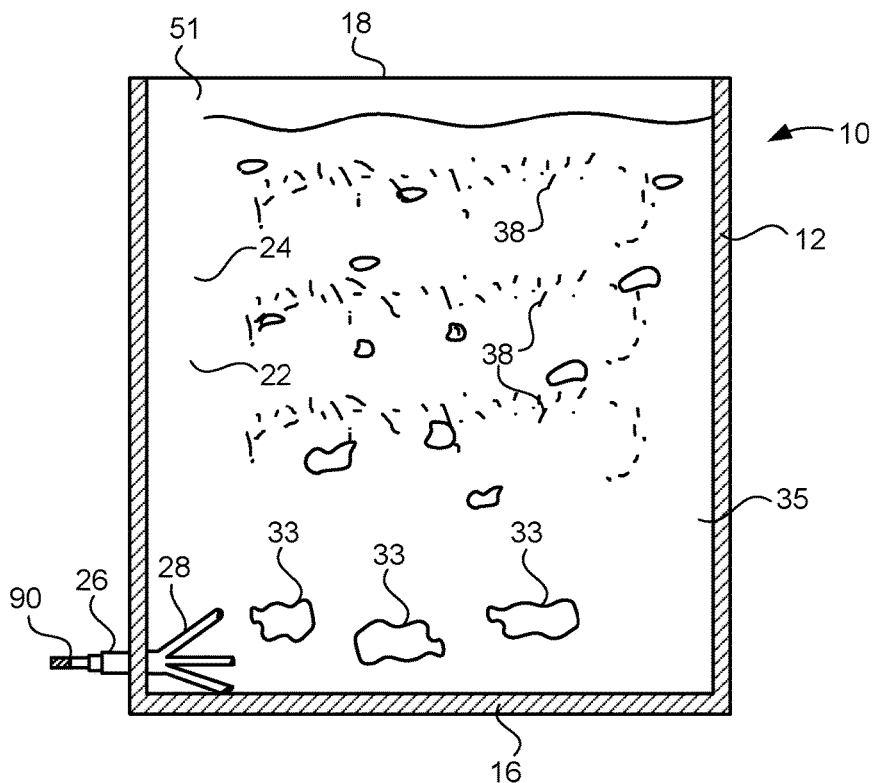
FIG. 6 is an illustration of the apparatus for cleaning of crawfish by the apparatus of the present invention.

FIG. 6 shows a step in the cleaning of crustacea or game in accordance with a apparatus of the present invention. In FIG. 6, the apparatus 10 includes the container 12 having the fluid inlet positioned adjacent to the bottom 16 of the container 12. The plurality of apertures 28 are connected to the fluid inlet 26 and are located within the interior volume 35 of the container 12. A garden hose 90 is connected to the fluid inlet 26. As such, the garden hose 90 can the can deliver water under pressure through the fluid inlet 26 and into the interior of the plurality of nozzles 28.

In FIG. 6, water has been introduced through the plurality of nozzles 28 and into the interior 35 of the container 12. The introduction of water and the cyclonic flow path illustrated in FIG. 3 causes the crustacea or game 33 to tumble in the area adjacent to the bottom 16 of the container 12. The fan-type flow of water from the plurality of nozzles 28 will serve to pressure-wash the tumbling crustacea or game 33. The debris 38, in the nature of dirt, mud, feathers, blood, or the like, will tend to move upwardly toward the upper edge 18 of the container 12. This is because the debris 38 is generally less dense than water and less dense than the crustacea or game 33. The cyclonic flow of water within the container 12 also serves to urge the debris 38 upwardly. The continual flow of water into the interior 35 of the container 12 will continually dilute the debris within the container. As such, soluble debris will be diluted as more and more water is introduced into the interior 35 the container 12. Ultimately, the insoluble and soluble debris will be discharged in the manner shown in FIG. 7.

Figure 7:
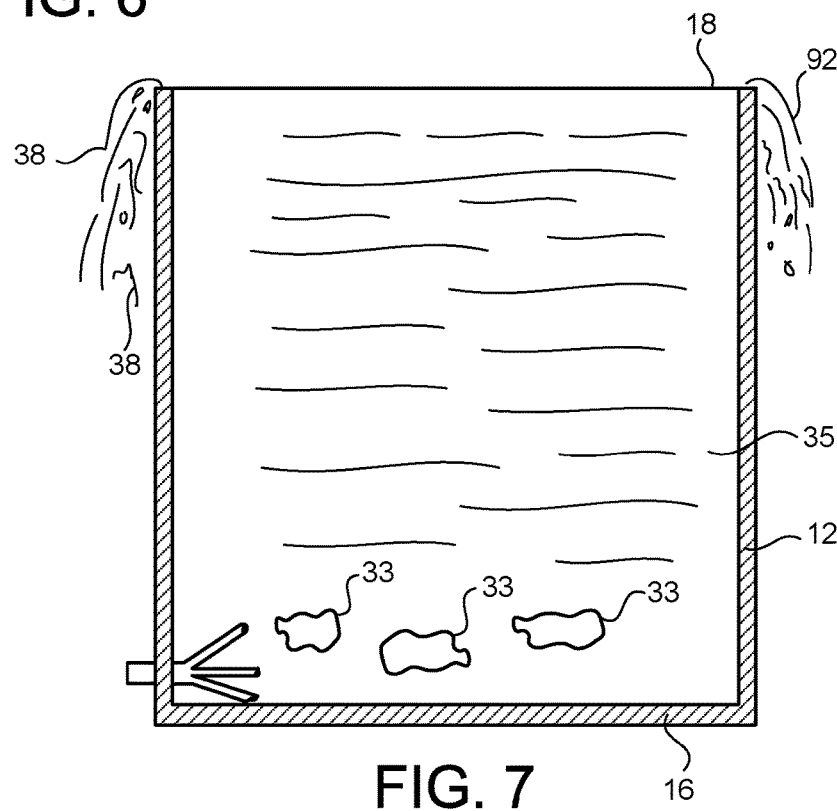
FIG. 7 is an illustration of a further step of the present invention as used in the cleaning of crawfish or game.

In FIG. 7, it can be seen that after a certain amount of time, the game or crustacea 33 will reside adjacent to the bottom 16 of the container 12. The water 92 from the interior 35 of the container 12 overflows the upper edge 18 of the container 12. This overflow will serve to discharge the debris 38 outwardly of the container 12. Ultimately, after a period of time, the debris from the crustacea or game will continue to dilute until only clear water resides within the interior 35 of the container 12. After the debris 38 has been discharged over the upper edge 18 of the container 12, and after the water has become sufficiently clear, the water flow can be turned off and the crustacea or game 33 removed from the interior 35 of the container 12. The crustacea or game will be very clean and suitable for use without further treatment. As such, when crawfish is the crustacea used in the system of the present invention, the crawfish will be almost polished completely clean. As such, they can be passed for boiling during a crawfish boil. The system of the present invention avoids the requirement for meticulously manually washing the crustacea or game. There is no need to fill buckets with crawfish and then use a water hose with the bucket in order to spray the crawfish and further dump the bucket after several sprayings. The present invention allows the crustacea or game to be cleaned in a relatively short period of time.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. An apparatus for cleaning crustacea or game, the apparatus consisting of:
   a container having an interior volume defined by a wall, said container having a bottom and an upper edge, the upper edge defining an open top of said container such that the interior volume is continuously exposed;
   a fluid inlet extending into the interior volume of said container, said fluid inlet adapted to pass a fluid under pressure into the interior volume of said container; and
   a plurality of nozzles connected to said fluid inlet, said plurality of nozzles directed in different directions, said plurality of nozzles positioned adjacent the wall of said container so as to direct the fluid from said fluid inlet toward another portion of the wall of said container, wherein one of said plurality of nozzles is directed generally toward the bottom of said container, wherein another of said plurality of nozzles is directed upwardly toward the upper edge of said container.

2. The apparatus of claim 1, wherein said plurality of nozzles are arranged one above another.

3. The apparatus of claim 1, wherein said plurality of nozzles are arranged to direct the fluid in a cyclonic pattern within said container.

4. The apparatus of claim 1, wherein each of said plurality of nozzles having an opening selected from the group consisting of a slit, a chord of a circle, and a circle.

5. The apparatus of claim 1, wherein said fluid inlet extends through the wall of said container, said fluid inlet having a portion positioned exterior of said container.

6. The apparatus of claim 5, further consisting of:
   a connector affixed to the portion of said fluid inlet exterior of said container.

7. The apparatus of claim 1, wherein said container has a diameter greater than a height of said container.

8. An apparatus for cleaning crustacea or game, the apparatus consisting of:
   a container having an interior volume defined by a wall, said container having a bottom and an upper edge, the upper edge defining an open top of said container;
   a fluid inlet extending into the interior volume of said container, said fluid inlet adapted to pass a fluid under pressure into the interior volume of said container; and
   a plurality of nozzles connected to said fluid inlet, said plurality of nozzles directed in different directions, said plurality of nozzles positioned adjacent the wall of said container so as to direct the fluid from said fluid inlet toward another portion of the wall of said container, wherein said container has a lip extending outwardly of said upper edge thereof, said lip curving outwardly and downwardly from said upper edge.

\* \* \* \* \*